(12) United States Patent
Jin et al.

(10) Patent No.: US 7,834,093 B2
(45) Date of Patent: Nov. 16, 2010

(54) POLYOLEFIN-BASED THERMOPLASTIC POLYMER COMPOSITION

(75) Inventors: Yang Seog Jin, Seongnam-si (KR); Seong Ki Park, Yongin-si (KR); Chang Woo Jin, Gunpo-si (KR); Chan Ki Lee, Gwangmyeong-si (KR); Se Hyun Cho, Seongnam-si (KR)

(73) Assignee: Polymersnet Co., Ltd., Siheung-Si, Gyeonggi-Do (KR)

( * ) Notice: Subject to any disclaimer, the term of this patent is extended or adjusted under 35 U.S.C. 154(b) by 525 days.

(21) Appl. No.: 11/312,051

(22) Filed: Dec. 20, 2005

(65) Prior Publication Data

US 2006/0183864 A1 Aug. 17, 2006

(30) Foreign Application Priority Data

Jan. 17, 2005 (KR) .................. 10-2005-0004332

(51) Int. Cl.
| | |
|---|---|
| C08L 23/00 | (2006.01) |
| C08L 23/04 | (2006.01) |
| C08L 33/00 | (2006.01) |
| C08L 33/02 | (2006.01) |
| C08L 33/14 | (2006.01) |
| C08L 33/24 | (2006.01) |
| C08L 35/02 | (2006.01) |
| C08K 5/00 | (2006.01) |
| C09D 5/02 | (2006.01) |
| C04B 24/26 | (2006.01) |

(52) U.S. Cl. .............. 525/191; 525/217; 525/218; 525/221; 525/222; 525/223; 525/240; 524/500; 524/515; 524/521; 524/523

(58) Field of Classification Search ........... 525/191, 525/217, 218, 221, 222, 223, 240; 524/500, 524/515, 521, 523
See application file for complete search history.

(56) References Cited

U.S. PATENT DOCUMENTS

| | | | |
|---|---|---|---|
| 3,085,082 A | 4/1963 | Baer et al. | |
| 3,410,931 A | 11/1968 | Johnson | |
| 4,728,692 A | 3/1988 | Sezaki et al. | |
| 4,863,995 A | 9/1989 | Murakami et al. | |
| 5,095,063 A | 3/1992 | Okada et al. | |
| 5,331,046 A | 7/1994 | Chang et al. | |
| 5,494,745 A * | 2/1996 | Vander Velden et al. | .... 428/354 |
| 5,981,665 A * | 11/1999 | Vestberg et al. | ............. 525/243 |
| 6,433,088 B1 | 8/2002 | Saraf | |
| 6,455,602 B1* | 9/2002 | Maki et al. | ................. 521/136 |
| 6,869,653 B2 | 3/2005 | Ling et al. | |

FOREIGN PATENT DOCUMENTS

| | | |
|---|---|---|
| EP | 0632071 A2 | 1/1995 |
| JP | 58-198529 A | 11/1983 |
| JP | 61-272217 A | 12/1986 |
| JP | 05-194843 A | 8/1993 |
| JP | 06-065438 A | 3/1994 |
| JP | 06-184212 A | 7/1994 |
| JP | 07-008903 A1 | 1/1995 |
| JP | 2001-310424 | 6/2001 |
| JP | 2003-313332 A | 11/2003 |
| JP | 2004-051808 | 2/2004 |
| JP | 2004-51808 | 2/2004 |
| KR | 10-1991-0024292 | 7/1993 |
| KR | 10-1995-0007662 | 7/1995 |
| KR | 10-20000068009 A | 11/2000 |
| KR | 10-2001-0009459 | 2/2001 |
| KR | 10-08-66652 B1 | 10/2008 |
| WO | 96/20228 | 7/1996 |
| WO | 2000/36011 A | 6/2000 |
| WO | 2006/075906 A1 | 7/2006 |

* cited by examiner

*Primary Examiner*—Nathan M Nutter
(74) *Attorney, Agent, or Firm*—Lucas & Mercanti, LLP; Klaus P. Stoffel

(57) ABSTRACT

Disclosed herein is a polyolefin-based thermoplastic polymer composition, in which an acrylate copolymer phase obtained by absorbing an alkyl acrylate monomer, an alkyl methacrylate monomer, a polar group-containing acrylate monomer and a polymerization initiator into a polyolefin matrix and then polymerizing the monomers is dispersed in a polyolefin phase. The thermoplastic polymer composition has excellent surface polarity leading to excellent paint adhesion.

17 Claims, No Drawings

POLYOLEFIN-BASED THERMOPLASTIC POLYMER COMPOSITION

BACKGROUND OF THE INVENTION

1. Field of the Invention

The present invention relates to a polyolefin-based thermoplastic polymer composition, and more particularly to a polyolefin-based thermoplastic polymer composition having high surface polarity leading to excellent paint adhesion 2. Background of the Related Art Generally, plastic parts, which are used as automotive interior and exterior parts, and parts of electric home appliances, are painted for improvements in aesthetic effects and surface properties, and for this, good adhesion between plastic resin and paints are required. Nonpolar polyolefin-based thermoplastic resins, such as polyethylene or polypropylene, are poor in adhesion with paints, and thus, have many difficulties in painting. To overcome such difficulties, various methods of surface pretreatment or methods of using functional additives are developed and being applied.

The surface pretreatment methods generally include a flame treatment method, a plasma treatment method, a UV irradiation method, a primer treatment method and a combination of two or more of these methods. However, the surface pretreatment methods have problems, such as additional equipment investment and increases in operation and maintenance costs. Particularly, the primer treatment method which is traditionally mainly used is a method of imparting paint adhesion to the surface of polyolefin-based thermoplastic resin by pre-applying chlorinated polyolefin-based resin to the polyolefin-based thermoplastic resin surface, and has problems in that it causes an increase in costs and uses environment-unfriendly materials.

The methods of using functional additives without surface pretreatment include a method of adding a large amount of polypropylene-g-maleic anhydride, a method of adding polyols having special chemical structures, and a method of chemically introducing functional additives into polyolefin. Among these methods, the method of adding a large amount of modified polyolefin, such as polypropylene-g-maleic anhydride, and the method of adding polyols having special chemical structures, have problems in that production cost is increased by the use of a large amount of expensive materials, and the physical properties of the resulting composite material are deteriorated by the addition of a large amount of additives. The method of chemically introducing functional additives into polyolefin (U.S. Pat. No. 6,133,374), which is a preparation method based on chemical decomposition, has a problem in that the control of chemical reaction is not easy, and thus, it is very difficult to obtain a polyolefin composite material with uniform and regular physical properties.

Korean patent Nos. 362824 and 395399 disclose methods of preparing polyolefin-based thermoplastic elastomers containing an acrylate-based copolymer. The thermoplastic elastomers prepared by these preparation methods are high in surface polarity and excellent in physical properties and chemical resistance, but very low in flowability. Thus, for the surface modification of the polyolefin-based composite material, a large amount of additives should be added to the polyolefin-based resin, resulting in deterioration in the physical properties and processability of the polyolefin composite material. For this reason, these methods were difficult to apply.

SUMMARY OF THE INVENTION

Therefore, the present invention has been made to solve the above-described problems occurring in the prior art, and it is an object of the present invention to provide a polyolefin-based thermoplastic polymer composition having high surface polarity leading to excellent paint adhesion.

To achieve the above object, the present invention provides a polyolefin-based thermoplastic polymer composition, in which an acrylate copolymer phase obtained by absorbing an alkyl acrylate monomer, an alkyl methacrylate monomer, a polar group-containing acrylate monomer and a polymerization initiator into a polyolefin matrix and then polymerizing the monomers is dispersed in a polyolefin phase.

In the inventive polyolefin-based thermoplastic composition, the content of the acrylate copolymer phase is 95-995 parts by weight based on 100 parts by weight of the polyolefin phase.

Also, the polyolefin comprises either an unblended polyolefin or a blend of two or more polyolefins.

The polyolefin blend comprises a blend of polyolefin and one or more polyethylene copolymer.

The polyethylene copolymer comprises at least one selected from the group consisting of poly(ethylene-co-methylacrylate), poly(ethylene-co-ethylacrylate), poly(ethylene-co-butylacrylate), poly(ethylene-co-acrylic acid), poly(ethylene-co-methacrylic acid), poly(ethylene-co-glycidyl methacrylate), poly(ethylene-co-maleic acid), poly(ethylene-co-vinyl acetate), poly(ethylene-co-acrylamide), and poly(ethylene-co-acrylonitrile).

The amount of the alkyl acrylate monomer used is 65-455 parts by weight based on 100 parts by weight of the polyolefin phase.

Preferably, the amount of the alkyl acrylate monomer used is 90-350 parts by weight based on 100 parts by weight of the polyolefin phase.

The amount of the alkyl methacrylate monomer used is 15-240 parts by weight based on 100 parts by weight of the polyolefin phase.

Preferably, the amount of the alkyl methacrylate monomer used is 45-150 parts by weight based on 100 parts by weight of the polyolefin phase.

The amount of the polar group-containing acrylate monomer used is 15-300 parts by weight based on 100 parts by weight of the polyolefin phase.

Preferably, the amount of the polar group-containing acrylate monomer used is 50-180 parts by weight based on 100 parts by weight of the polyolefin phase.

In the inventive polyolefin-based thermoplastic polymer composition, the polymerization initiator is used in an amount of 0.5-2.0 mole % based on the sum of the mole of the monomers and the mole of the polymerization initiator.

DETAILED DESCRIPTION OF THE PREFERRED EMBODIMENT

Hereinafter, the present invention will be described in detail.

(First Polymerization Step)

Into a reactor equipped with a stirrer, a heater and a cooler, 50-200 parts by weight, based on 100 parts by weight of polyolefin, of an alkyl acrylate monomer and 500-1,000 parts by weight of water are charged. Also, a polymerization initiator is charged into the reactor in an amount of 0.5-2.0 mol % based on the sum of the mole of the acrylate monomer and the mole of the polymerization initiator, and the reactor is then closed. If the content of the alkyl acrylate monomer is less than 50 parts by weight, the impregnation of monomers for second polymerization will be poor, and if the content is more than 200 parts by weight, the monomer content which is not absorbed into the polyolefin matrix will be increased, thus causing a reduction in yield and a problem in waste water treatment. If the polymerization initiator is used in an amount of less than 0.5 mole % based on the sum of the mole of the acrylate monomer and the mole of the polymerization initiator, a high-molecular weight polyacrylate polymer will be produced which does not meet the object of the present invention, and if the polymerization initiator is used in an amount of more than 2.0 mole %, a ultra-low-molecular weight polyacrylate polymer will be produced which causes a reduction in the physical properties of the resulting product and makes process control difficult.

The closed reactor is purged with high-pressure nitrogen gas with stirring to remove oxygen. Then, the temperature within the reactor is elevated to an absorption temperature of 45-120° C. depending on the kind of the selected polymerization initiator to absorb the alkyl acrylate monomer into the polyolefin pellets. The absorption time is 1-5 hours depending on the kinds of the polyolefin and the alkyl acrylate monomer.

In the prior art, the pellets and the monomer are placed in the reactor and stirred to absorb the monomer, and then, water is added to the stirred material before polymerization. In this case, however, there is a problem in that if the control of the reactor temperature is failed, rapid polymerization can occur, thus making the use of the entire reactor impossible. On the other hand, in the present invention, water is used in the monomer absorption process, and thus, temperature is easily controlled without significantly influencing the absorption time of the monomer, and heating and cooling effects are excellent.

After the alkyl acrylate monomer is absorbed into polyolefin pellets, the pellets and water within the reactor are heated with stirring to induce the decomposition of the polymerization initiator and the polymerization of the acrylate monomer. The alkyl acrylate monomer and polymerization initiator absorbed into the polyolefin pellets are polymerized in the pellets to form polyacrylate. The polymerization time is 3-10 hours depending on the kinds of the polyolefin, the alkyl acrylate monomer and the polymerization initiator.

(Second Polymerization Step)

After completion of the first polymerization step, the temperature within the reactor is lowered to room temperature, and 10-85 parts by weight, based on 100 parts by weight of the product obtained in the first polymerization step, of an alkyl acrylate monomer, 10-100 parts by weight of a polar group-containing acrylate monomer, and 10-80 parts by weight of an alkyl methacrylate monomer are charged into the reactor. Also, a polymerization initiator is charged into the reactor in an amount of 0.5-2.0 mole % based on the sum of the mole of the acrylate monomers and the mole of the polymerization initiator. Then, a second polymerization step is carried out in the same manner as in the first polymerization step. If the alkyl acrylate monomer is used in an amount of less than 10 parts by weight, processability will be poor, thus making it impossible to achieve the object of the present invention, and if it is used in an amount of more than 85 parts by weight, the effect of improving paint adhesion, the object of the present invention, will be reduced. If the polar group-containing acrylate monomer is used in an amount of less than 10 parts by weight, the effect of improving paint adhesion will be reduced, and if it is used in an amount of more than 100 parts by weight, undesired side-reactions, such as intramolecular crosslinking or chemical reactions, will occur during processing steps, thus making it impossible to achieve the object of the present invention. If the alkyl methacrylate monomer is used in an amount of less than 10 parts by weight, the processabilty of the resulting product will be poor, thus making it impossible to achieve the object of the present invention, and if it is used in an amount of more than 80 parts by weight, the effect of improving paint adhesion will be reduced. If the polymerization initiator is used in an amount of less than 0.5 mole % based on the sum of the mole of the acrylate monomers and the mole of the polymerization initiator, the resulting product will be poor in processability, and if it is used in an amount of more than 2.0 mole %, the physical properties of the resulting product will be deteriorated and a difficulty in process control will be caused.

After completion of the polymerization, the reactor is sufficiently cooled and the reaction solution within the reactor is filtered to obtain pellets. The obtained pellets are in a swollen state as a result of the copolymerization of the absorbed acrylate monomers in the pellets. The obtained pellets are dried in a hot-air oven.

Hereinafter, each of the components used in the above reactions will be described in more detail.

(A) Polyolefin

Examples of polyolefin used in the present invention include high-density polyethylene, low-density polyethylene, linear low-density polyethylene, polyethylene copolymers, polyethylene having a functional group chemically bound to the main chain, and polyethylene having a functional group chemically bound to the branched chain.

Examples of a comonomer contained in the polyethylene copolymer include, but are not limited to, propylene, butene, pentene, octene, butadiene, ethylidene norbornene, 1,4-hexadiene, dicyclopentadiene, methyl acrylate, ethyl acrylate, butyl acrylate, glycidyl methacrylate, acrylic acid, methacrylic acid, vinyl acetate, maleic anhydride, itaconic anhydride, acrylonitrile, and acrylamide.

Examples of the functional group include, but are not limited to, maleic anhydride, itaconic anhydride, acrylic acid, methacrylic acid, acrylonitrile, acrylamide, vinyl pyrrolidone, and styrene.

Also, examples of the polyolefin used in the present invention include polypropylene, polypropylene copolymers, polypropylene having a functional group chemically bound to the main chain, and polypropylene having a functional group chemically bound to the branched chain. Examples of a copolymer used in the polypropylene copolymers include, but are not limited to, ethylene and butylene. Examples of the functional group include, but are not limited to, maleic anhydride, itaconic anhydride, acrylic acid, methacrylic acid, acrylonitrile, acrylamide, vinyl pyrrolidone, and styrene.

Furthermore, polyolefin used in the present invention may be a polyolefin alone or a blend of two or more polyolefins. If the blend of two or more polyolefins is used, it is preferably a blend of polyolefin and polyethylene copolymer. The polyethylene copolymer used in the polyolefin blend include, but are not limited to, poly(ethylene-co-methylacrylate), poly (ethylene-co-ethylacrylate), poly(ethylene-co-butylacrylate), poly(ethylene-co-acrylic acid), poly(ethylene-co-methacrylic acid), poly(ethylene-co-glycidyl methacrylate), poly (ethylene-co-maleic acid), poly(ethylene-co-vinyl acetate), poly(ethylene-co-acrylamide) and poly(ethylene-co-acrylonitrile).

(B) Acrylate Monomers

The acrylate monomers used in the present invention include: 1) alkyl acrylate; 2) alkyl methacrylate; and 3) a polar group-containing acrylate monomer.

The alkyl acrylate is an alkyl acrylate having at least one carbon atom, and preferably at least two carbon atoms, in the alkyl chain. Examples of the alkyl acrylate used in the present invention include, but are not limited to, methyl acrylate, ethyl acrylate, and butyl acrylate.

The alkyl methacrylate preferably has 1-18 carbon atoms in the alkyl chain. Particularly, since the alkyl methacrylate act to improve the flowability of the thermoplastic polymer and inhibit side-reactions, such as intramolecular crosslinking reaction, it is more preferably for the display of this action that the alkyl methacrylate has 1-4 carbon atoms.

Examples of the alkyl methacrylate used in the present invention include, but are not limited to, methyl methacrylate, ethyl methacrylate, and butyl methacrylate.

Examples of the polar group-containing acrylate include, but are not limited to, hydroxyalkyl acrylate, hydroxyalkyl methacrylate, acrylamide, aminoalkyl acrylate, aminoalkyl methacrylate, acrylic acid, and methacrylic acid. The polar group-containing acrylate preferably has 1-18 carbon atoms in the alkyl chain. More preferably, it has 1-4 carbon atoms so that it acts to improve the flowability of the thermoplastic polymer and to inhibit side reactions, such as intramolecular crosslinking reaction.

(C) Polymerization Initiator

As a polymerization initiator for the polymerization of the acrylate monomers, a polymerization initiator which has been used in the prior art to induce the free radical reaction of the acrylate monomers to form a polymer is used, and examples thereof include azobisisobutyronitrile, benzoyl peroxide, lauroyl peroxide, t-butyl peroxide, dicumyl peroxide, t-butyl peracetate, 2,2-bis(t-butylperoxy)butane, 2,5-bis(t-butylperoxy)-2,5-dimethyl-3-hexyne, and 2,5-bis(t-butylperoxy)-2,5-dimethylhexane.

The polymerization initiator can be selected from the above exemplified polymerization initiators depending on the kinds of the selected polyolefin and acrylate monomer.

Hereinafter, the present invention will be described in more detail by the following examples. It is to be understood, however, that these examples are not construed to limit the scope of the present invention.

Example 1

First Polymerization Step

As polyolefin, a polyolefin blend was used. The polyolefin blend was prepared by blending 50 Parts by weight of polypropylene (melt index: 60 g/10 min) and 100 parts by weight of poly(ethylene-co-butyl acrylate) (manufactured by DuPont; melt index: 4 g/10 min) in a co-rotating twin-screw extruder (D=20 mm, L/D=40) at a melting temperature of 170-190° C. The polyolefin blend was cooled in a cooling water bath and palletized with a pelletizer. Then, the pellets were dried in a hot-air oven at 80° C. for 3 hours.

Into a 50-liter reactor equipped with a stirrer, a heater and a cooler, 6.0 kg of the polyolefin blend pellets, 6.0 kg of n-butyl acrylate, 233 g of lauroyl peroxide and 27.5 kg of water were charged, and the reactor was closed. The closed reactor was purged with high-pressure nitrogen gas with stirring to remove oxygen. To lower the oxygen concentration, the purge operation was repeated three times. Then, the temperature within the reactor was elevated to 55° C. so that the n-butyl acrylate was absorbed into the polyolefin blend pellets for 2 hours. For the complete absorption of the introduced monomer, the temperature within the reactor was elevated to 65° C., followed by stirring for 1 hour. For the polymerization of the n-butyl acrylate monomer, the temperature within the reactor was elevated to 70° C., followed by stirring for 2 hours. Then, the temperature within the reactor was elevated to 75° C., with attention to heat generation caused by the polymerization, and maintained at this temperature for 1 hour. After completion of the reaction, the obtained pellets were dried in a hot-air oven at 85° C. for 6 hours.

Second Polymerization Step

The pellets obtained in the first polymerization step were subjected to a second polymerization step.

6.0 kg of the pellets obtained in the first polymerization step, 3.1 kg of n-butyl acrylate, 3.1 kg of methyl methacrylate, 1.6 kg of hydroxypropyl methacrylate and 317 g of lauroyl peroxide were charged into a reactor, and subjected to the second polymerization step in the same manner as in the first polymerization step.

After completion of the polymerization, the reactor was sufficiently cooled, and the reaction solution within the reactor was filtered to obtain pellets. The obtained pellets were in a swollen state as a result of the copolymerization of the absorbed acrylate monomer in the pellets. The obtained pellets were dried in a hot-air oven at 85° C. for 6 hours. The yield of the final product was 98.4%.

(Preparation of Polyolefin Compound and Paint Adhesion Test)

15% by weight of the completely dried pellets obtained in the second polymerization step and 85% by weight of polypropylene (melt index=60 g/10 min, 230° C., 2.16 kg) were blended with each other in a co-rotating twin-screw extruder to prepare a compound, and the compound was passed through an injection molding machine to prepare a plaque test sample. The obtained plaque test sample was applied with a suitable amount of a spray-type paint, followed by drying for 24 hours.

To evaluate paint adhesion, the sample was tested according to a 2 mm×2 mm block peel-off test method, and the paint adhesion of the sample was evaluated by the number of remaining paint lattice blocks.

Examples 2-8

Thermoplastic polymers were prepared in the same manner as in Example 1 except that the contents of the acrylate monomers in the second polymerization step varied as shown in Table 1 below.

Also, a polypropylene compound was prepared in the same manner as in Example 1, and a plaque test sample prepared from the compound was evaluated for paint adhesion.

Examples 9-10

Test samples were prepared and evaluated in the same manner as in Example 1 except that ethyl acrylate was used as alkyl acrylate. However, the prepared thermoplastic polymers were used in amounts of 15% by weight and 20% by weight, respectively, to prepare polypropylene compounds, and evaluated for paint adhesion.

Example 11

A test sample was prepared and evaluated in the same manner as in Example 1 except that methyl acrylate was used as alkyl acrylate. However, the prepared thermoplastic polymer was used in an amount of 15% by weight to prepare polypropylene compounds, and evaluated for paint adhesion.

Example 12

A test sample was prepared and evaluated in the same manner as in Example 1 except that hydroxybutyl methacrylate was used as the polar group-containing acrylate monomer.

Example 13

A test sample was prepared and evaluated in the same manner as in Example 1 except that butyl methacrylate was used as the alkyl methacrylate.

Examples 14-15

Test samples were prepared and evaluated in the same manner as in Example 1. However, the prepared thermoplastic polymers were used in amounts of 15% by weight and 20% by weight, respectively, to prepare polypropylene compounds, and evaluated for paint adhesion.

TABLE 1

| Example | Pellets (kg) obtained in the first polymerization step | Alkyl acrylate content (kg) | Alkyl methacrylate content (kg) | Polar group-containing acrylate monomer content (kg) | Polymerization initiator content (g) | Final product yield (%) | Polyolefin compound Polyolefin (wt %) | Polyolefin compound Thermoplastic polymer (wt %) | Paint adhesion test result (number of remaining paint lattice blocks among 100 paint lattice blocks) |
|---|---|---|---|---|---|---|---|---|---|
| 1 | 6.0 | 3.1 | 3.1 | 1.6 | 317 | 98.4 | 85 | 15 | 100 |
| 2 | 6.0 | 3.7 | 2.5 | 1.5 | 311 | 98.7 | 85 | 15 | 100 |
| 3 | 6.0 | 3.1 | 2.1 | 2.1 | 303 | 98.1 | 85 | 15 | 100 |
| 4 | 6.0 | 3.0 | 2.4 | 2.1 | 309 | 98.2 | 85 | 15 | 100 |
| 5 | 6.0 | 3.2 | 2.3 | 2.1 | 304 | 98.0 | 85 | 15 | 100 |
| 6 | 6.0 | 3.2 | 2.0 | 2.3 | 304 | 98.3 | 85 | 15 | 100 |
| 7 | 6.0 | 1.5 | 1.6 | 4.5 | 185 | 96.4 | 85 | 15 | 100 |
| 8 | 6.0 | 2.9 | 0.4 | 4.2 | 223 | 94.2 | 85 | 15 | 95 |
| 9 | 6.0 | 1.0 | 1.0 | 5.6 | 278 | 96.3 | 85 | 15 | 94 |
| 10 | 6.0 | 1.0 | 1.0 | 5.6 | 278 | 96.3 | 80 | 20 | 100 |
| 11 | 6.0 | 1.4 | 1.6 | 4.5 | 316 | 98.3 | 85 | 15 | 100 |
| 12 | 6.0 | 3.1 | 2.1 | 2.1 | 291 | 97.9 | 85 | 15 | 100 |
| 13 | 6.0 | 3.7 | 2.5 | 1.5 | 260 | 98.2 | 85 | 15 | 100 |
| 14 | 6.0 | 1.1 | 1.1 | 5.5 | 357 | 97.9 | 85 | 15 | 96 |
| 15 | 6.0 | 1.1 | 1.1 | 5.5 | 357 | 97.9 | 80 | 20 | 100 |

Hereinafter, the effect of the acrylate monomers on the mechanical properties such as flexural modulus and Izod impact strength will be described by more examples.

Example 16

A test sample was prepared and evaluated in the same manner as in Example 1 except that in the second polymerization step, ethyl acrylate was used as alkyl acrylate and except that the contents of the acrylate monomers and initiator were different from the ones in example 1 as shown in Table 2 below.

Example 17

A test sample was prepared and evaluated in the same manner as in Example 1 except that in the second polymerization step, ethyl acrylate was used as alkyl acrylate, hydroxyethyl methacrylate was used as polar group-containing acrylate and except that the contents of the acrylate monomers and initiator were different from the ones in Example 1 as shown in Table 2 below.

Example 18

A test sample was prepared and evaluated in the same manner as in Example 17 except that in the second polymerization step, the contents of alkyl acrylate, polar group-containing acrylate and initiator were different from the ones in Example 17 as shown in Table 2 below.

Example 19

A test sample was prepared and evaluated in the same manner as in Example 1 except that in the second polymerization step, the contents of acrylate monomers and initiator were different from the ones in Example 1 as shown in Table 2 below.

TABLE 2

| Example | Pellets (kg) obtained in the first polymerization step | Alkyl acrylate content (kg) | Alkyl methacrylate content (kg) | Polar group-containing acrylate monomer content (kg) | Polymerization initiator content (g) | Final product yield (%) | Polyolefin compound Polyolefin (wt %) | Polyolefin compound Thermoplastic polymer (wt %) | Paint adhesion test result (number of remaining paint lattice blocks among 100 paint lattice blocks) | Flexural Modulus (23°, Kgf/Cm$^2$) | Izod Impact Strength (kg-cm/cm, 23°, notched. Thickness: 6.4 mm) |
|---|---|---|---|---|---|---|---|---|---|---|---|
| 1 | 6.0 | 3.1 | 3.1 | 1.6 | 317 | 98.4 | 85 | 15 | 100 | 1,285 | 30.4 |
| 16 | 6.0 | 3.0 | 2.4 | 2.1 | 341 | 98.2 | 85 | 15 | 100 | 1,396 | 30.4 |
| 17 | 6.0 | 1.5 | 3.0 | 3.0 | 339 | 98.0 | 85 | 15 | 100 | 1,323 | 35.2 |
| 18 | 6.0 | 1.8 | 3.0 | 2.7 | 342 | 97.9 | 85 | 15 | 100 | 1,370 | 32.9 |
| 19 | 6.0 | 1.8 | 3.0 | 2.7 | 313 | 97.2 | 85 | 15 | 100 | 1,347 | 33.9 |

As can be seen from Table 2, the polyolefin compound according to Example 1 possesses excellent mechanical and paint adhesion properties. However, the polyolefin compound according to Example 16~19 has excellent paint adhesion properties and possesses excellent mechanical properties that are superior to the polyolefin compound according to Example 1.

Comparative Example 1

Only polyolefin prepared in Example 1 was injection molded into a plaque test sample, and the sample was tested for paint adhesion. The results are shown in Table 3.

As can be seen from the test results, the polyolefin containing no thermoplastic polymer prepared by the present invention had no paint adhesion.

Comparative Examples 2 to 3

Into a 50-liter reactor equipped with a stirrer, a heater and a cooler, 6.0 kg of a blend of ethylene-butyl acrylate copolymer (melt index=4; manufactured by Borealis) and polypropylene, 12.37 kg of n-butyl acrylate, 0.15 kg of glycidyl methacrylate, 0.015 kg of 1,6-hexanedioldiacrylate, 194.60 g of lauroyl peroxide and 25 kg of water were charged, and the reactor was closed. The closed reactor was purged with high-pressure nitrogen gas with stirring to remove oxygen. To lower the oxygen concentration, the purge operation was repeated three times. The temperature within the reactor was elevated to 55° C. so that the acrylate monomers were absorbed into the polyolefin blend pellets for 1 hour. To absorb acrylate monomers which could remain in water, the temperature within the reactor was elevated to 65° C., followed by stirring for 1 hour. For the polymerization of the acrylate monomers, the temperature within the reactor was elevated to 70° C., followed by stirring for 2 hours. Then, the temperature within the reactor was elevated to 75° C., with attention to heat generation caused by the polymerization, and maintained at this temperature for 1 hour. After completion of the reaction, the obtained pellets were dried in a hot-air oven at 75° C. for 8 hours.

The completely dried pellets and polypropylene (melt index=60 g/10 min, 230° C., 2.16 kg) were blended with each other in a co-rotating twin-screw extruder to prepare compounds, and the prepared compounds were injection molded to prepare plaque test samples. In this regard, the contents of the pellets in the compounds were 15% by weight and 50% by weight, respectively. The obtained flat test samples were applied with a suitable amount of a spray-type paint, dried for 24 hours, and evaluated for paint adhesion by a peel-off test in the same manner as in Example 1. The results are shown in Table 3.

As can be seen from the test results, the thermoplastic polymer with crosslinking bonds, prepared using the multifunctional acrylate monomer, such as 1,6-hexanedioldiacrylate, had little or no effect of imparting paint adhesion when it was added to the polyolefin-based composite material.

Comparative Example 4

A test sample was prepared and evaluated in the same manner as in Example 1 except that 6.0 kg of pellets (polyolefin blend) obtained in the first polymerization step in the same manner as in Example 1, 4.3 kg of n-butyl acrylate, 3.2 kg of methyl methacrylate, and 134 g of azobisisobutyronitrile, a polymerization initiator, were charged into a reactor, and hydroxypropyl methacrylate as the polar group-containing acrylate monomer was not used. The result is shown in Table 3 below. As can be seen from the test results, the polymer containing no polar group-containing acrylate monomer, such as hydroxypropyl methacrylate, had no effect of imparting paint adhesion even when it was added to the polyolefin compound.

Comparative Example 5

A test sample was prepared and evaluated in the same manner as in Example except that 6.0 kg of pellets (polyolefin blend) prepared in the first polymerization step in the same manner as in Example 1, 2.2 kg of methyl methacrylate, 5.4 kg of hydroxypropyl methacrylate, and 189.5 g of lauroyl peroxide, a polymerization initiator were charged into a reactor, and n-butyl acrylate was not used. The result is shown in Table 3.

As can be seen from the test result, the polymer containing no alkyl acrylate, such as n-butyl acrylate, had no effect of imparting paint adhesion when it was added to the polyolefin compound.

TABLE 3

| Comparative Example | Polyolefin compound | | Paint adhesion test results (number of remaining paint lattice) blocks among 100 paint lattice blocks) |
|---|---|---|---|
| | Polyolefin (wt %) | Thermoplastic polymer (wt %) | |
| 1 | 100 | 0 | 0 |
| 2 | 85 | 15 | 0 |
| 3 | 50 | 50 | 20 |
| 4 | 80 | 20 | 0 |
| 5 | 80 | 20 | 0 |

As can be seen from the foregoing, the polyolefin-based thermoplastic polymer composition according to the present invention is very excellent in paint adhesion because it is excellent in surface polarity so that it can be applied directly with paints without a need for primer treatment.

What is claimed is:

1. A polyolefin-based thermoplastic polymer composition comprising
    an acrylate copolymer phase comprising an acrylate copolymer of an alkyl acrylate monomer, an alkyl methacrylate monomer, and a polar group-containing acrylate monomer; and
    a polyolefin phase comprising a blend of a polyolefin and at least one polyethylene copolymer,
    wherein the acrylate copolymer phase is dispersed in the polyolefin phase,
    wherein the polyethylene copolymer comprises at least one selected from the group consisting of poly(ethylene-co-methylacrylate), poly(ethylene-co-ethylacrylate), poly(ethylene-co-butylacrylate), poly(ethylene-co-acrylic acid), poly(ethylene-co-methacrylic acid), poly(ethylene-co-glycidyl methacrylate), poly(ethylene-co-maleic acid), poly(ethylene-co-vinyl acetate), poly(ethylene-co-acrylamide), and poly(ethylene-co-acrylonitrile); and
    wherein the amount of the alkyl acrylate monomer is 65-455 parts by weight based on 100 parts by weight of the polyolefin phase, the amount of the alkyl methacrylate monomer is 15-240 parts by weight based on 100 parts by weight of the polyolefin phase, and the amount of the polar group-containing acrylate monomer is 15-300 parts by weight based on 100 parts by weight of the polyolefin phase.

2. The thermoplastic polymer composition of claim 1, wherein the amount of the acrylate copolymer phase is 95-995 parts by weight based on 100 parts by weight of the polyolefin phase.

3. The thermoplastic polymer composition of claim 1, wherein the acrylate copolymer phase is obtained by the steps comprising:
  absorbing an alkyl acrylate monomer, an alkyl methacrylate monomer, a polar group-containing acrylate monomer, and a polymerization initiator into a polyolefin matrix; and
  polymerizing the monomers.

4. The thermoplastic polymer composition of claim 3, wherein the amount of the alkyl acrylate monomer used in the polymerization is 90-350 parts by weight based on 100 parts by weight of the polyolefin phase.

5. The thermoplastic polymer composition of claim 3, wherein the amount of the alkyl methacrylate monomer used in the polymerization is 45-150 parts by weight based on 100 parts by weight of the polyolefin phase.

6. The thermoplastic polymer composition of claim 3, wherein the amount of the polar group-containing acrylate monomer used in the polymerization is 50-180 parts by weight based on 100 parts by weight of the polyolefin phase.

7. The thermoplastic polymer composition of claim 3, wherein the amount of the polymerization initiator used in the polymerization is 0.5-2.0 mole % based on the sum of the mole of the monomers and the mole of the polymerization initiator.

8. The thermoplastic polymer composition of claim 3, wherein the polyolefin matrix is prepared by the steps comprising:
  absorbing an alkyl acrylate monomer and a polymerization initiator into a blend of a polyolefin and at least one polyethylene copolymer; and
  polymerizing the monomer.

9. The thermoplastic polymer composition of claim 1, further comprising a polymer of an alkyl acrylate monomer, wherein the polymer of an alkyl acrylate monomer is dispersed in the polyolefin phase.

10. The thermoplastic polymer composition of claim 1, wherein the polyolefin included in the blend is a polypropylene.

11. The thermoplastic polymer composition of claim 1, wherein the alkyl acrylate monomer is a methyl acrylate, an ethyl acrylate or a butyl acrylate.

12. The thermoplastic polymer composition of claim 1, wherein the alkyl methacrylate monomer is a methyl methacrylate, an ethyl methacrylate or a butyl methacrylate.

13. The thermoplastic polymer composition of claim 1, wherein the polar group-containing acrylate monomer is selected from the group consisting of a hydroxyalkyl acrylate, a hydroxyalkyl methacrylate, an acrylamide, an aminoalkyl acrylate, aminoalkyl methacrylate, acrylic acid, and methacrylic acid.

14. The thermoplastic polymer composition of claim 3, wherein the polymerization initiator is selected from the group consisting of azobisisobutyronitrile, benzoyl peroxide, lauroyl peroxide, t-butyl peroxide, dicumyl peroxide, t-butyl peracetate, 2,2-bis(t-butylperoxy)butane, 2,5-bis(t-butylperoxy)-2,5-dimethyl-3-hexyne, and 2,5-bis(t-butylperoxy)-2,5-dimethylhexane.

15. A thermoplastic polymer composition of claim 1, wherein the composition comprises:
  (a) an acrylate phase comprising an acrylate copolymer of an alkyl acrylate monomer, an alkyl methacrylate monomer, and a polar group-containing acrylate monomer; and
  (b) a polyolefin phase comprising a blend of a polypropylene and a polyethylene copolymer;
  wherein
  the acrylate copolymer phase is dispersed in the polyolefin phase;
  the alkyl acrylate monomer is selected from the group consisting of a methyl acrylate, an ethyl acrylate and a butyl acrylate;
  the alkyl methacrylate monomer is selected from the group consisting of a methyl methacrylate, an ethyl methacrylate and a butyl methacrylate;
  the polar group-containing acrylate monomer is selected from the group consisting of a hydroxyalkyl acrylate, a hydroxyalkyl methacrylate, an acrylamide, an aminoalkyl acrylate, aminoalkyl methacrylate, acrylic acid, and methacrylic acid; and
  the polyethylene copolymer is selected from the group consisting of poly(ethylene-co-methylacrylate), poly(ethylene-co-ethylacrylate), poly(ethylene-co-butylacrylate), poly(ethylene-co-acrylic acid), poly(ethylene-co-methacrylic acid), poly(ethylene-co-glycidyl methacrylate), poly(ethylene-co-maleic acid), poly(ethylene-co-vinyl acetate), poly(ethylene-co-acrylamide), and poly(ethylene-co-acrylonitrile).

16. A thermoplastic polymer composition of claim 1, wherein the composition comprises:
  (a) an acrylate phase comprising an acrylate copolymer of an alkyl monomer, an alkyl methacrylate monomer, and a polar group-containing acrylate monomer; and
  (b) a polyolefin phase comprising a blend of a polypropylene and a poly(ethylene-co-butylacrylate),
  wherein
  the alkyl acrylate monomer is a methyl acrylate, an ethyl acrylate or a n-butyl acrylate;
  the alkyl methacrylate monomer is a methyl methacrylate, or a butyl methacrylate;
  the polar group-containing acrylate monomer is a hydroxyethyl methacrylate, a hydroxypropyl methacrylate, or a hydroxylbutyl methacrylate; and
  the acrylate phase is dispersed in the polyolefin phase.

17. A polyolefin-based thermoplastic polymer coating composition comprising
  an acrylate copolymer phase comprising an acrylate copolymer of an alkyl acrylate monomer, an alkyl methacrylate monomer, and a polar group-containing acrylate monomer; and
  a polyolefin phase comprising a blend of a polyolefin and at least one polyethylene copolymer,
  wherein the acrylate copolymer phase is dispersed in the polyolefin phase.

* * * * *